United States Patent
Senjyu

(10) Patent No.: US 10,935,831 B1
(45) Date of Patent: Mar. 2, 2021

(54) LIQUID CRYSTAL DEVICE AND METHOD FOR MANUFACTURING LIQUID CRYSTAL DEVICE

(71) Applicant: JVCKENWOOD CORPORATION, Yokohama (JP)

(72) Inventor: Youichi Senjyu, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/998,863

(22) Filed: Aug. 20, 2020

(30) Foreign Application Priority Data

Sep. 24, 2019 (JP) .............................. JP2019-172971

(51) Int. Cl.
*G02F 1/1333* (2006.01)
*G02F 1/1339* (2006.01)

(52) U.S. Cl.
CPC ...... *G02F 1/133382* (2013.01); *G02F 1/1339* (2013.01)

(58) Field of Classification Search
CPC .................. G02F 1/133382; G02F 1/1339
See application file for complete search history.

(56) References Cited

U.S. PATENT DOCUMENTS

2010/0271783 A1* 10/2010 Miyashita ................. G06F 1/20
361/707
2011/0249405 A1* 10/2011 Kinoe .................. H04N 9/3144
361/704

FOREIGN PATENT DOCUMENTS

JP    H11-119233 A    4/1999
JP    2002-296568 A   10/2002

* cited by examiner

*Primary Examiner* — James A Dudek
(74) *Attorney, Agent, or Firm* — Procopio, Cory, Hargreaves & Savitch LLP

(57) ABSTRACT

A liquid crystal device includes a heat sink, a plurality of heat-dissipating gels formed on the heat sink with intervals therebetween, and a liquid crystal display element disposed above the heat sink with the plurality of heat-dissipating gels interposed therebetween, the liquid crystal display element including a silicon substrate, a glass substrate, and a liquid crystal contained therebetween.

5 Claims, 8 Drawing Sheets

LIQUID CRYSTAL DEVICE AND METHOD FOR MANUFACTURING LIQUID CRYSTAL DEVICE

CROSS REFERENCE TO RELATED APPLICATION

This application is based upon and claims the benefit of priority from Japanese patent application No. 2019-172971, filed on Sep. 24, 2019, the disclosure of which is incorporated herein in its entirety by reference.

BACKGROUND

The present disclosure relates to a liquid crystal device and a method for manufacturing a liquid crystal device. In particular, the present disclosure relates to a liquid crystal device and a method for manufacturing a liquid crystal device capable of improving image quality.

Japanese Unexamined Patent Application Publications No. H11-119233 and No. 2002-296568 disclose a method for manufacturing a liquid crystal display element capable of displaying a high-quality image.

SUMMARY

Regarding the liquid crystal display elements and the liquid crystal devices including liquid crystal display elements, it has been desired to further improve their quality.

A liquid crystal device according to an aspect of an embodiment include: a plate; a plurality of heat-dissipating gels formed on the plate with intervals therebetween; and a liquid crystal display element disposed above the plate with the plurality of heat-dissipating gels interposed therebetween, the liquid crystal display element including a silicon substrate, a glass substrate, and a liquid crystal contained therebetween.

A method for manufacturing a liquid crystal device according to an aspect of an embodiment includes: forming a plurality of heat-dissipating gels with intervals therebetween on the plate; and mounting, above the plate, a liquid crystal display element in such a manner that the plurality of heat-dissipating gels are interposed between the plate and the liquid crystal display element, the liquid crystal display element including a silicon substrate, a glass substrate, and a liquid crystal contained therebetween.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

<Matters Examined Before First Embodiment is Conceived>

Prior to describing a liquid crystal device (a liquid crystal display apparatus) according to a first embodiment, technical matters that the inventors had examined in advance will be described. A liquid crystal display element provided in a liquid crystal device in a conceptual phase before this embodiment is conceived is formed in such a manner that a silicon substrate and a glass substrate, which constitute the liquid crystal display element, are in parallel to each other when the liquid crystal display element is manufactured. However, in the above-described structure, there is a following problem. That is, when the liquid crystal display element of the finished product is driven (i.e., operated), the parallel state between the silicon substrate and the glass substrate is lost because the liquid crystal contained therebetween thermally expands, thus causing the quality of images to deteriorate.

In recent years, in particular, a laser light source or an LED (Light Emitting Diode) light source has been used in place of a lamp light source in a projector equipped with such a liquid crystal device (a liquid crystal display apparatus) in order to increase its life span and improve its color reproducing property. Therefore, there is a problem that when the laser light source or the LED light source is used, unevenness in a displayed image caused by differences in the thickness of the liquid crystal layer, which is not visually recognized when the lamp light source is used, is visually recognized as interference fringes (in particular, as interference fringes caused by light in a blue wavelength region which is a short wavelength region in the light region of RGB colors).

Therefore, the inventors have found a liquid crystal display element according to a first embodiment and a liquid crystal device including a liquid crystal display element capable of preventing image quality from deteriorating even when the liquid crystal thermally expands when the liquid crystal display element is driven.

First Embodiment

Figure 1:
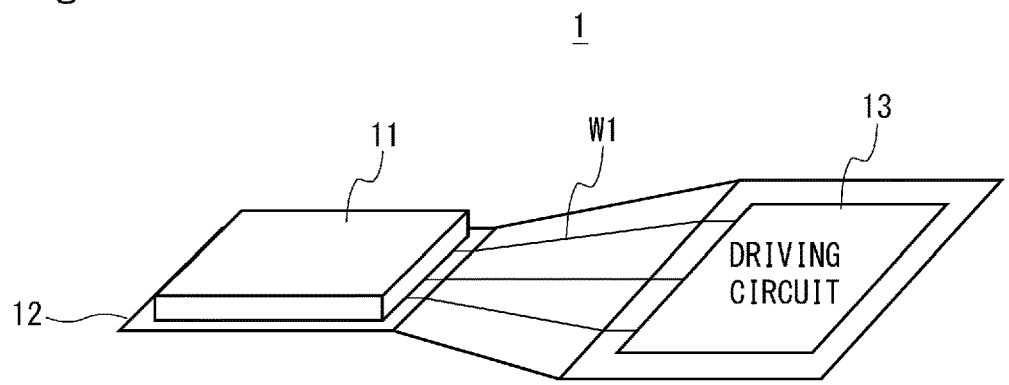
FIG. 1 is a schematic perspective view of a liquid crystal device according to a first embodiment.
Figure 1:
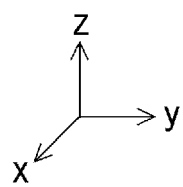

FIG. 1 is a schematic perspective view of a liquid crystal device (a liquid crystal display apparatus) 1 according to a first embodiment. As shown in FIG. 1, a liquid crystal device 1 includes at least a heat sink (plate) 12, a liquid crystal display element 11 mounted above the heat sink 12, and a driving circuit 13 that is electrically connected to the liquid crystal display element 11 through a plurality of signal lines W1 and drives the liquid crystal display element 11. The liquid crystal display element 11 includes, for example, a silicon substrate serving as a driving substrate, a glass substrate serving as an opposed substrate, and a liquid crystal contained therebetween.

Next, a method for manufacturing a liquid crystal device 1 (a method for constructing a liquid crystal device 1) will be described with reference to FIGS. 2 to 7. FIGS. 2 to 7 are schematic cross-sectional views showing a method for manufacturing a liquid crystal device 1.

Figure 2:
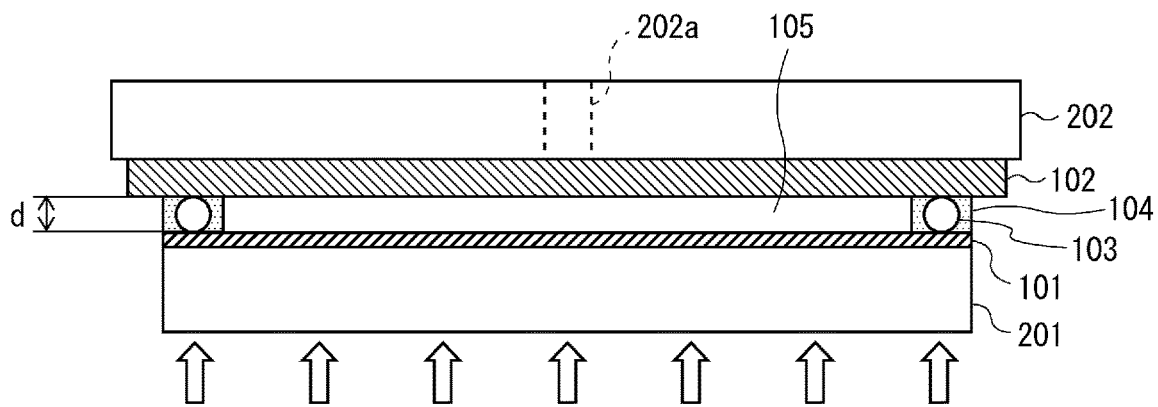
FIG. 2 is a schematic cross-sectional view showing a method for manufacturing a liquid crystal device according to the first embodiment.
Figure 2:
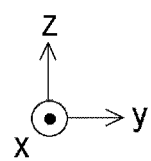

Firstly, as shown in FIG. 2, a silicon substrate 101 fixed to a surface plate 201 is disposed so as to be opposed to a glass substrate 102 fixed to a surface plate 202 with spacers 103 and sealing agents 104 enveloping the spacers 103 interposed therebetween. Note that, as an example, an air flow path(s) 202a is formed in the surface plate 202 on the glass substrate 102 side. Further, the sealing agent 104 is, for example, a UV (UltraViolet) curing resin. After that, the surface plate 201 on the silicon substrate 101 side is pressed onto the glass substrate 102 side by using an air cylinder or the like, so that the silicon substrate 101 and the glass substrate 102 are bonded together. At this stage, the silicon substrate 101 and the glass substrate 102 are arranged so that there is an interval equivalent to a diameter d of the spacer 103 between the two substrates. In this way, a space 105 is formed between the silicon substrate 101 and the glass substrate 102.

Figure 3:
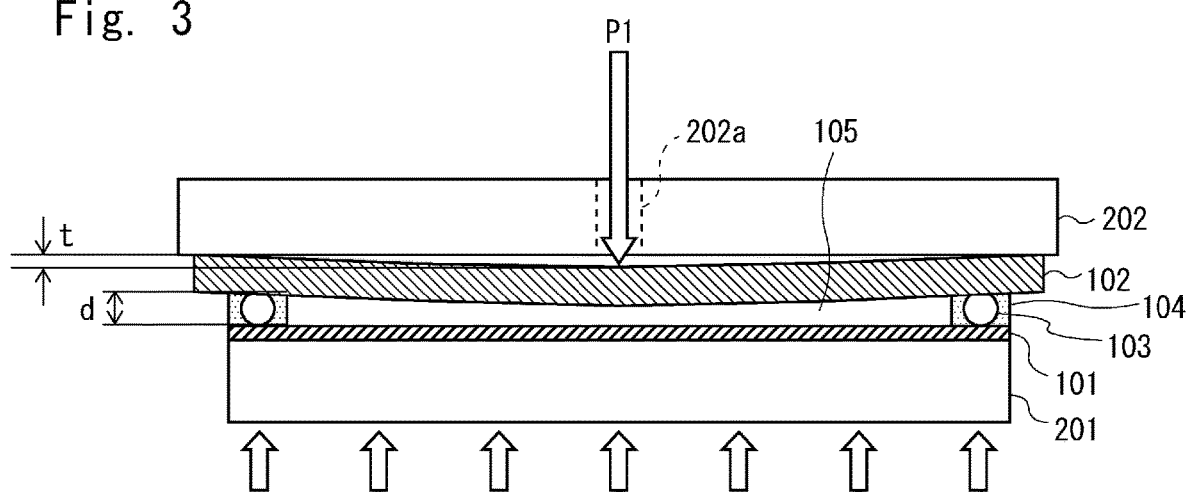
FIG. 3 is a schematic cross-sectional view showing the method for manufacturing the liquid crystal device according to the first embodiment.
Figure 3:
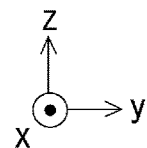

Next, as shown in FIG. 3, air P1 is blown onto a central part of the main surface on the outer side of the glass substrate 102 (i.e., the main surface of the glass substrate 102 opposite to the main surface thereof opposed to the silicon substrate 101, i.e., the main surface positioned outside the liquid crystal display element 11) through the air flow path 202a formed in the surface plate 202 on the glass substrate 102 side. That is, the central part of the main surface on the outer side of the glass substrate 102 is pressed by blowing the air P1 onto it. As a result, the glass substrate 102 is curved (i.e., is concaved) so that its central part is brought closer to the silicon substrate 101 side.

Note that the inventors carried out an elaborate experiment for an example case where a rise in the temperature of the liquid crystal of the finished product when the liquid crystal display element 11 thereof was driven (i.e., operated) was 20 degrees and the thickness (the width in the z-axis direction) of the liquid crystal layer (which will be described later) contained in the space 105 was 2.1 and found that the degree of expansion of the liquid crystal caused by the rise in the temperature was about 0.1 μm in the thickness direction. Therefore, for example, an amount t of a deformation (hereinafter also referred to as the deformation amount t) of the central part of the glass substrate 102 in the thickness direction (the z-axis direction) is preferably in the range between 1/30 of the diameter d of the spacer 103 to 1/20 thereof. In this way, it is possible to bring the silicon substrate 101 and the glass substrate 102 closer to a parallel state according to the thermal expansion of the liquid crystal of the finished product that occurs when the liquid crystal display element 11 thereof is driven. For reference, the coefficient of thermal expansion (hereinafter also refer to as the thermal expansion coefficient) of the liquid crystal is $7.2 \times 10^{-4}$ and the thermal expansion coefficient of the glass substrate is $4.5 \times 10^{-6}$. Further, the thermal expansion coefficient of the sealing agent is $5.0 \times 10^{-5}$ and the thermal expansion coefficient of the driving substrate is $3.9 \times 10^{-6}$. From these values, it is understood that the liquid crystal tends to expanded more than the glass substrate, the sealing agent, the driving substrate, and the like do.

Figure 4:
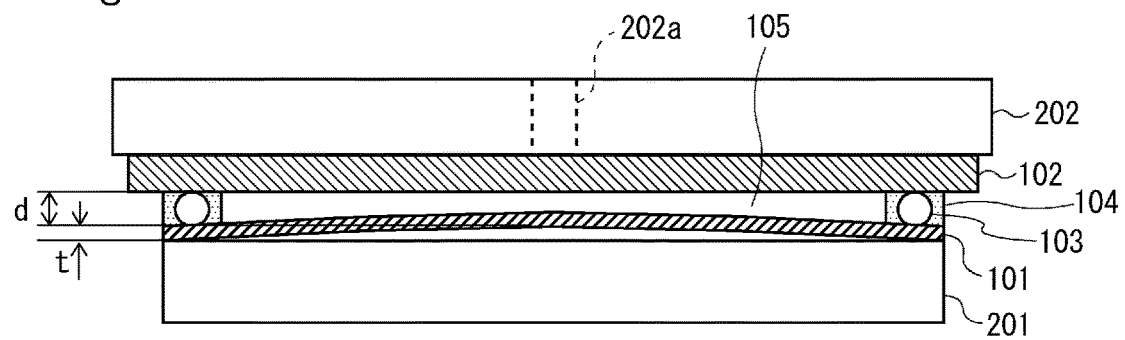
FIG. 4 is a schematic cross-sectional view showing the method for manufacturing the liquid crystal device according to the first embodiment.
Figure 4:
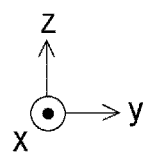

Next, as shown in FIG. 4, the supply of the air P1 is stopped. As a result, the glass substrate 102 is restored to its original flat shape, and to compensate for the restoration of the glass substrate 102, the silicon substrate 101, which is softer than the glass substrate 102, is curved so that its central part moves closer to the glass substrate 102 side. Note that it is assumed that the deformation amount of the central part of the silicon substrate 101 in the thickness direction in this process is equal to the deformation amount t of the central part of the glass substrate 102 in the thickness direction.

Figure 5:
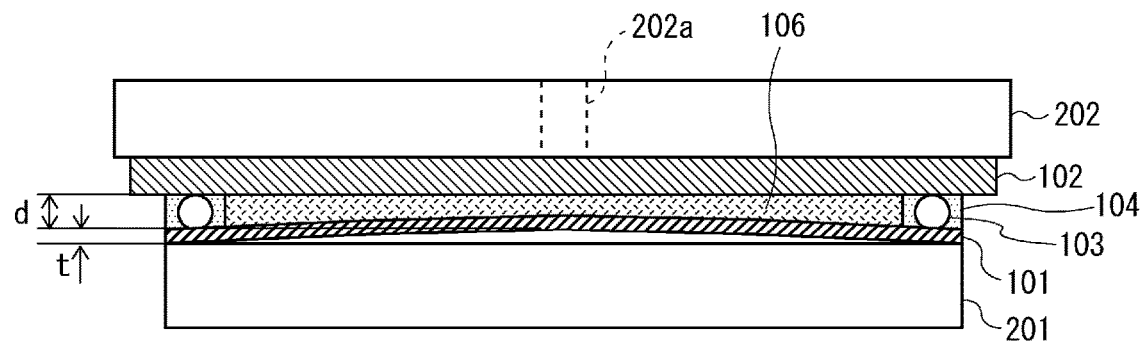
FIG. 5 is a schematic cross-sectional view showing the method for manufacturing the liquid crystal device according to the first embodiment.
Figure 5:
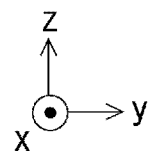

Next, as shown in FIG. 5, in the state where the curved shape of the silicon substrate 101 is maintained, the space 105 formed between the silicon substrate 101 and the glass substrate 102 is filled with a liquid crystal 106 and then sealed. As a result, the reflection-type liquid crystal display element 11 is formed.

Figure 6:
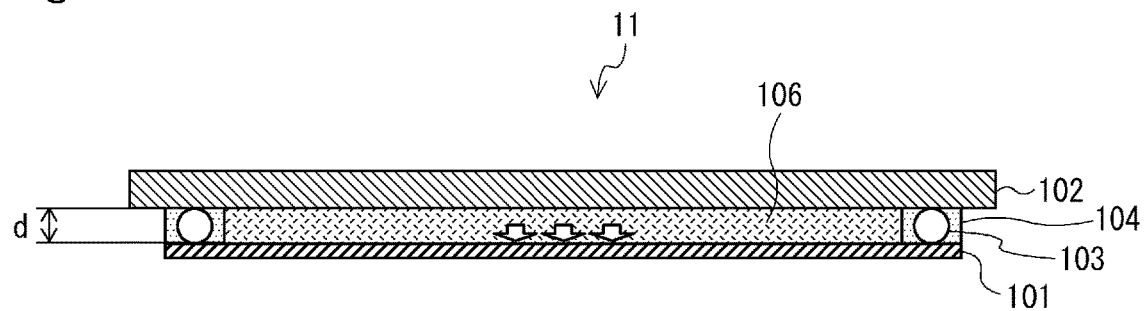
FIG. 6 is a schematic cross-sectional view showing the method for manufacturing the liquid crystal device according to the first embodiment.
Figure 6:
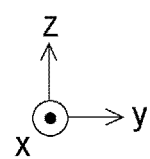

FIG. 6 shows a shape of the manufactured liquid crystal display element 11 when it is driven. As shown in FIG. 6, in the liquid crystal display element 11, since the silicon substrate 101 is pressed from the inside (from the liquid crystal 106 side) due to the thermal expansion of the liquid crystal 106 when the liquid crystal display element 11 is driven, the curved silicon substrate 101 returns to the flat shape. As a result, the silicon substrate 101 and the glass substrate 102 become roughly parallel to each other (ideally, substantially parallel to each other). As a result, the quality of images displayed by the liquid crystal display element 11 is improved.

In this embodiment, an example case in which the silicon substrate 102 is deformed into a curved shape when the liquid crystal display element 11 is manufactured, and then the silicon substrate 101 is deformed by using the restoring force of the glass substrate 102 returning to the flat shape has been described. However, the present disclosure is not limited to such an example. The silicon substrate 101 may be directly deformed into a curved shape.

The liquid crystal display element 11 is mounted, for example, above the heat sink 12, and then installed in a projector or the like as a liquid crystal device.

Figure 7:
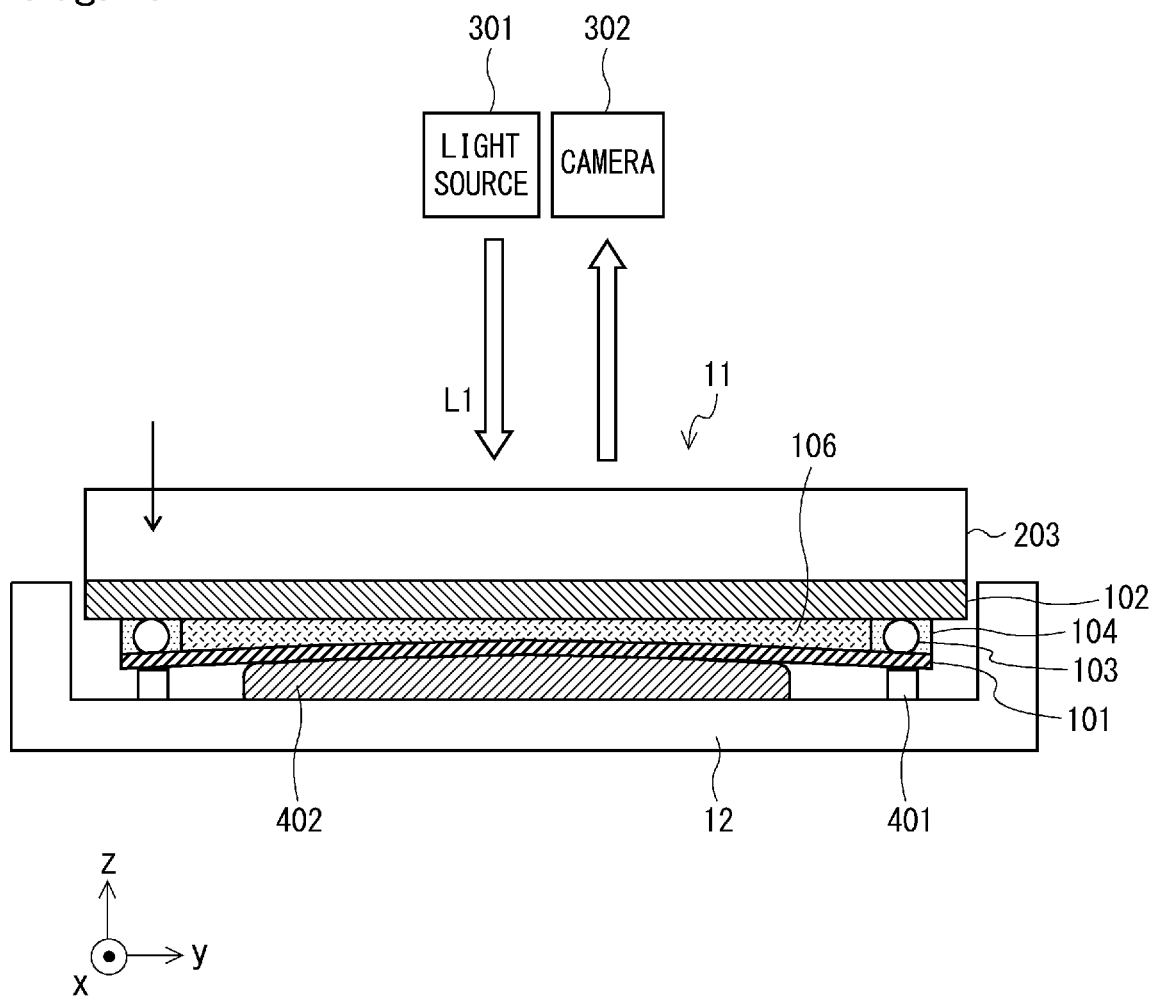
FIG. 7 is a schematic cross-sectional view showing the method for manufacturing the liquid crystal device according to the first embodiment.
Figure 8:
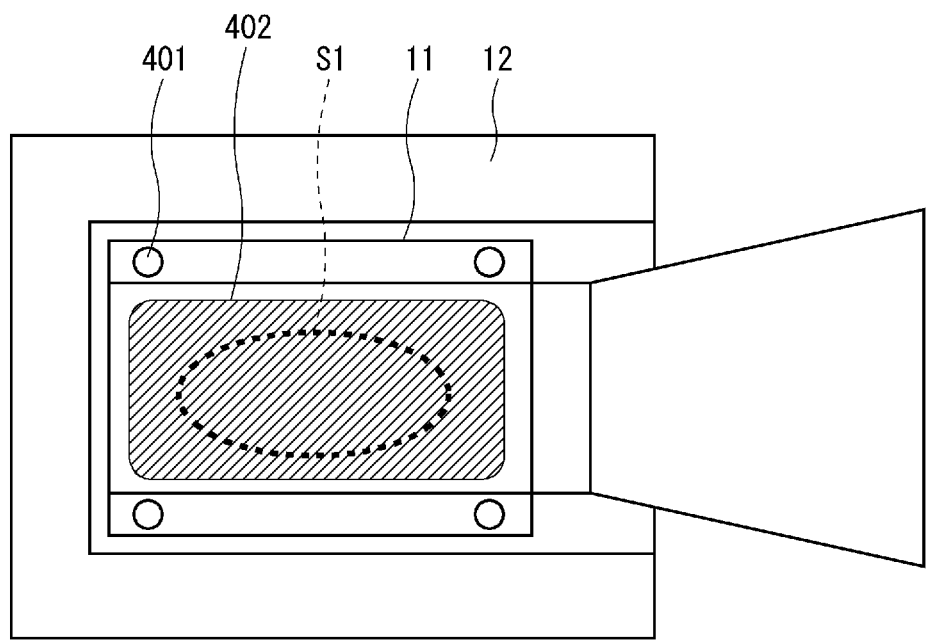
FIG. 8 is a schematic plan view for explaining the method for manufacturing the liquid crystal device shown in FIG. 7.

FIGS. 7 and 8 are a schematic cross-sectional view and a schematic plan view, respectively, for explaining a method of mounting a liquid crystal display element 11 above a heat sink 12.

As shown in FIG. 7, firstly, the main surface on the outer side of the glass substrate 102 of the liquid crystal display element 11, which has been completed through the processes shown in FIGS. 2 to 6, is sucked by a transparent sucking member 203. The liquid crystal display element 11 can be moved by moving this sucking member 203. After that, through the sucking member 203, the liquid crystal display element 11 is irradiated with light L1 emitted from a light source 301. For example, the light source 301 is either a laser light source or an LED (Light Emitting Diode) light source. The light L1 emitted from the light source 301 is preferably light in a blue wavelength region. In this way, unevenness in an image displayed by reflected light of the light L1 in the liquid crystal display element 11 can be visually recognized as interference fringes more easily. The shape of the interference fringes is photographed by a camera 302 or the like and displayed in a monitor (not shown).

After that, while maintaining the state where the interference fringes S1 is displayed by the reflected light of the light L1 in the liquid crystal display element 11 (i.e., in the state where the curved shape of the silicon substrate 101 is maintained), the liquid crystal display element 11 is moved and mounted above the heat sink 12 (see FIG. 8). In this way, it is possible to maintain the quality of images displayed by the liquid crystal display element 11 in a high-quality state.

It should be noted that adhesives 401 for bonding the liquid crystal display element 11 to the heat sink 12, and a heat-dissipating gel (a silicon gel) 402 that is used together with the heat sink 12 to dissipate heat of the liquid crystal display element 11 are provided between the liquid crystal display element 11 and the heat sink 12. Referring to FIG. 8, the adhesives 401 are disposed near the four corners of the rectangular liquid crystal display element 11 in a plan view, and the heat-dissipating gel 402 is disposed in an area including the central part of the liquid crystal display element 11 in the plan view.

In this embodiment, an example case in which the liquid crystal display element 11 is moved and mounted above the heat sink 12 while maintaining the state in which the interference fringes S1 are displayed by the reflected light of the light L1 in the liquid crystal display element 11 has been described. However, the present disclosure is not limited to such an example. As long as the curved shape of the silicon substrate 101 is maintained, other mounting methods may be used. For example, the liquid crystal display element 11 may be moved and mounted above the heat sink 12 while measuring the thickness of the silicon substrate 101 by using a spectroscope.

Further, in this embodiment, an example case in which the liquid crystal display element 11 is mounted above the heat sink 12 has been described. However, the present disclosure is not limited to such an example. Even when the liquid crystal display element 11 is mounted above a plate other than the heat sink 12, the quality of images displayed by the liquid crystal display element 11 can be maintained in a high-quality state by using a technique similar to the technique that is used when the liquid crystal display element 11 is mounted above the heat sink 12.

As described above, the liquid crystal display element 11 according to this embodiment is formed so that the silicon substrate 101 has a curved shape at a room temperature. In this way, in the liquid crystal display element 11, the silicon substrate 101 returns to the flat shape due to the thermal expansion of the liquid crystal 106 when the liquid crystal display element 11 is driven, so that the silicon substrate 101 and the glass substrate 102 become roughly parallel to each other (ideally, substantially parallel to each other). As a result, the quality of images displayed by the liquid crystal display element 11 is improved.

<Matters Examined Before Second Embodiment is Conceived>

Prior to describing a liquid crystal device (a liquid crystal display apparatus) according to a second embodiment, technical matters that the inventors had examined in advance will be described.

Figure 9:
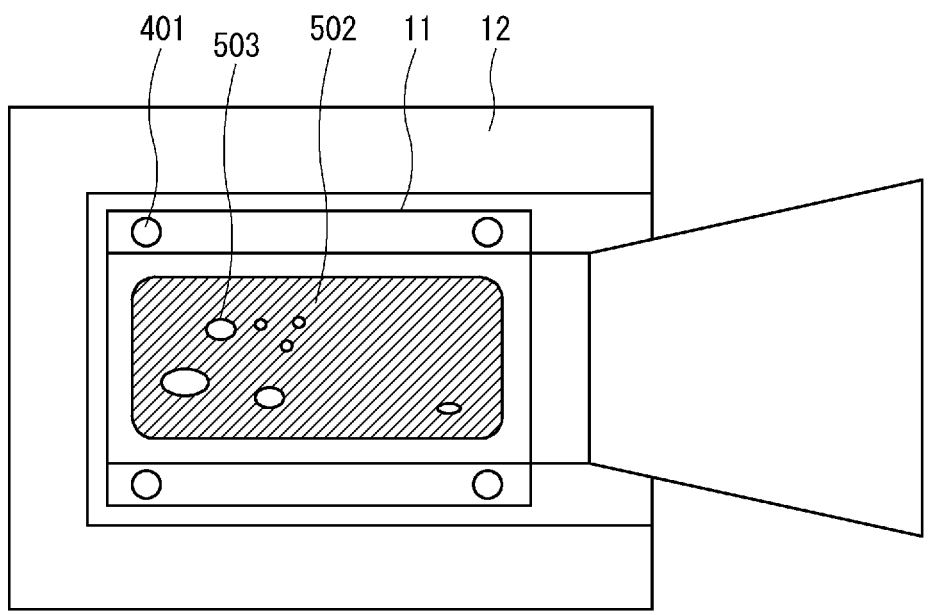
FIG. 9 is a schematic plan view for explaining a problem in a liquid crystal device in a conceptual phase before a second embodiment is conceived.
Figure 9:
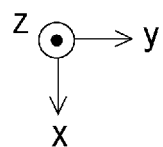

FIG. 9 is a schematic plan view for explaining a problem in a liquid crystal device 20 in a conceptual phase before this embodiment is conceived. As shown in FIG. 9, in the liquid crystal device 20, for example, the liquid crystal display element 11 according to the first embodiment is mounted above the heat sink 12. Further, adhesives 401 for bonding the liquid crystal display element 11 to the heat sink 12, and a heat-dissipating gel (a silicon gel) 502 that is used together with the heat sink 12 to dissipate heat of the liquid crystal display element 11 are provided between the liquid crystal display element 11 and the heat sink 12.

Note that in the example shown in FIG. 9, the heat-dissipating gel 502 is integrally formed over the entire surface of the adhesive surface between the liquid crystal display element 11 and the heat sink 12. However, in this case, since a plurality of air bubbles 503 having different sizes are unevenly formed inside the heat-dissipating gel 502, the liquid crystal display element 11 is inclined from a desired angle as the plurality of air bubbles 503 thermally expand when the liquid crystal display element 11 is driven. Therefore, unevenness occurs in an image displayed by the liquid crystal display element 11. As a result, there is a problem that the quality of images deteriorates in the liquid crystal device 20. In particular, in the case where the heat-dissipating gel 502 is formed by mixing two solvents, this problem is more likely to occur because air bubbles 503 are more likely to be formed.

Further, the thermal conductivity of heat (radiation) from the light source 301 or heat generated as the liquid crystal display element 11 itself is driven to the heat sink 12 through the heat-dissipating gel 502 changes depending on the presence/absence of air bubbles 503. For example, in an area where air bubbles 503 exist, the heat of the liquid crystal display element 11 is less likely to be dissipated (i.e., transferred) to the heat sink 502 through the heat-dissipating gel 12, while in an area where no air bubble 503 exist, the heat of the liquid crystal display element 11 is more likely to be dissipated (i.e., transferred) to the heat sink 502 through the heat-dissipating gel 12. Therefore, when a plurality of air bubbles 502 having different sizes are unevenly formed in the heat-dissipating gel 502, the degree of expansion of the liquid crystal 106 becomes uneven. Therefore, the silicon substrate 101, which has the curved shape at a room temperature, does not deform into the desired flat shape when the liquid crystal display element 11 is driven. As a result, unevenness caused by the shape of the silicon substrate 101 occurs in an image displayed by the liquid crystal display element 11. Consequently, there is a problem that the quality of images deteriorates in the liquid crystal device 20. This problem is more likely to occur as the sizes of air bubbles 503 increase.

Further, the adhesives 401 for bonding the heat sink 12 and the liquid crystal display element 11 are formed of a soft material so as to prevent stresses from being exerted on the liquid crystal display element 11 as much as possible. Therefore, an unintended deformation of the liquid crystal display element 11 causes a deformation of the soft adhesives 401. As a result, the liquid crystal display element 11 is inclined from the desired angle and hence unevenness occurs in an image displayed by the liquid crystal display element 11. Consequently, there is a problem that the quality of images deteriorates in the liquid crystal device 20.

Therefore, the inventors have found a liquid crystal display device according to a second embodiment capable of preventing the position of a liquid crystal display element from deviating due to the thermal expansion of air bubbles formed inside the heat-dissipating gel even when the temperature of the heat-dissipating gel rises when the liquid crystal display element is driven, and thereby preventing the quality of images from deteriorating.

Second Embodiment

Figure 10:
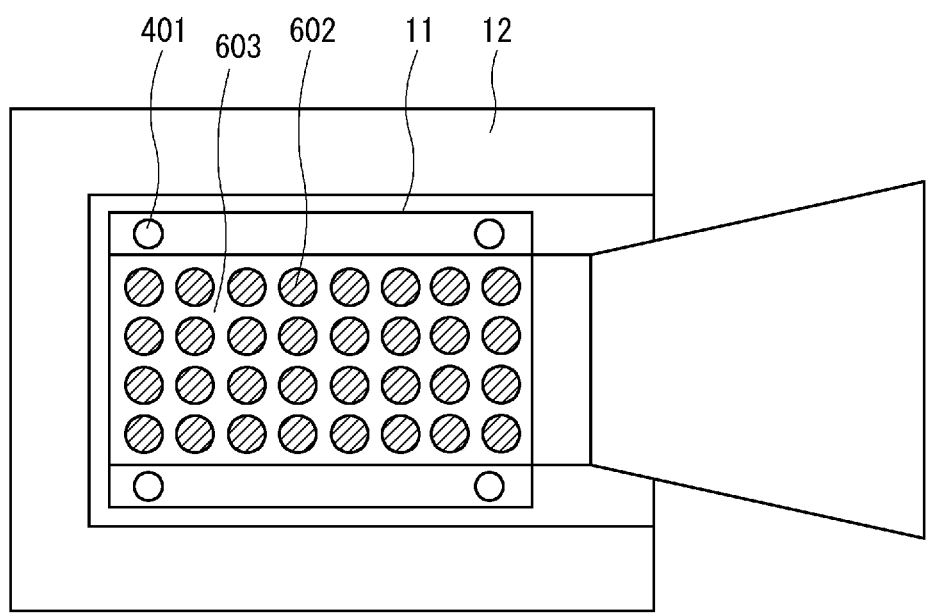
FIG. 10 is a schematic plan view of a part of a liquid crystal device according to the second embodiment.

FIG. 10 is a schematic plan view showing a part of a liquid crystal device (a liquid crystal display apparatus) 2 according to a second embodiment. As shown in FIG. 10, in the liquid crystal device 2, for example, the liquid crystal display element 11 according to the first embodiment is mounted above the heat sink 12. Further, adhesives 401 for bonding the liquid crystal display element 11 to the heat sink 12, and a plurality of heat-dissipating gels 602 (i.e., a plurality of lumps of heat-dissipating gels) that are used together with the heat sink 12 to dissipate heat of the liquid crystal display element 11 are provided between the liquid crystal display element 11 and the heat sink 12. Each of the plurality of heat-dissipating gels (i.e., the plurality of lumps of heat-dissipating gels) 602 are, for example, silicon gels (a plurality of lumps of silicon gels) and are formed, for example, by mixing two solvents.

Note that in the example shown in FIG. 10, in a plan view, a plurality of circular heat dissipating gels (i.e., a plurality of circular lumps of heat-dissipating gels) 602 are formed with intervals therebetween (in this example, formed in a matrix pattern) over the entire surface of the bonding surface between the liquid crystal display element 11 and the heat sink 12. These intervals (spaces) 603 between the heat-dissipating gels 602 communicate with a space(s) outside the liquid crystal display element 11. Therefore, even when the air present in the intervals 603 thermally expands, it is discharged to the space outside the liquid crystal display element 11. Therefore, the deviation of the position of the liquid crystal display element 11, which would otherwise occur due to the thermal expansion of the air present in the intervals 603, does not occur.

Further, since the size of each heat-dissipating gel 602 is smaller than the size of the heat-dissipating gel 502 shown in FIG. 9, the sizes of the air bubbles formed inside the heat-dissipating gels 602 is smaller than the sizes of the air bubbles 503 formed inside the heat-dissipating gel 502. Therefore, the deviation of the position of the liquid crystal display element 11 caused by the thermal expansion of the air bubbles formed inside each heat-dissipating gel 502 is negligibly small (at least, smaller than that in the example shown in FIG. 9).

Further, even when the air bubbles formed in each of the plurality of heat-dissipating gels 602 thermally expand, the entire main surface of the liquid crystal display element 11 is uniformly pressed, so that the direction of the main surface of the liquid crystal display element 11 is not inclined and is maintained in the desired direction.

As described above, in the liquid crystal device 2 according to this embodiment, a plurality of heat-dissipating gels 602 are formed with intervals therebetween over the entire bonding surface between the liquid crystal display element 11 and the heat sink 12. Even when the air present in the intervals (the spaces) 603 between these heat-dissipating gels 602 thermally expands, it is discharged to the space outside the liquid crystal display element 11. Further, since the size of each heat-dissipating gel 602 is reduced, the sizes of air bubbles formed inside each heat-dissipating gel 602 are also reduced. Therefore, the deviation of the position (the deviation from the desired angle) of the liquid crystal display element 11 caused by the thermal expansion of the air present in the intervals 603 or caused by the air bubbles having small sizes is reduced to a negligible level. As a result, it is possible to prevent the quality of images displayed by the liquid crystal display element 11 from deteriorating.

Further, since the uneven formation of air bubbles is prevented, the degree of expansion of the liquid crystal 106 can be made uniform. Therefore, it is possible to deform the silicon substrate 101, which has a curved shape at a room temperature, into a desired flat shape when the liquid crystal display element 11 is driven. As a result, the deviation of the position of the liquid crystal display element 11 is prevented or minimized, thus making it possible to prevent the quality of images displayed by the liquid crystal display element 11 from deteriorating.

Figure 11:
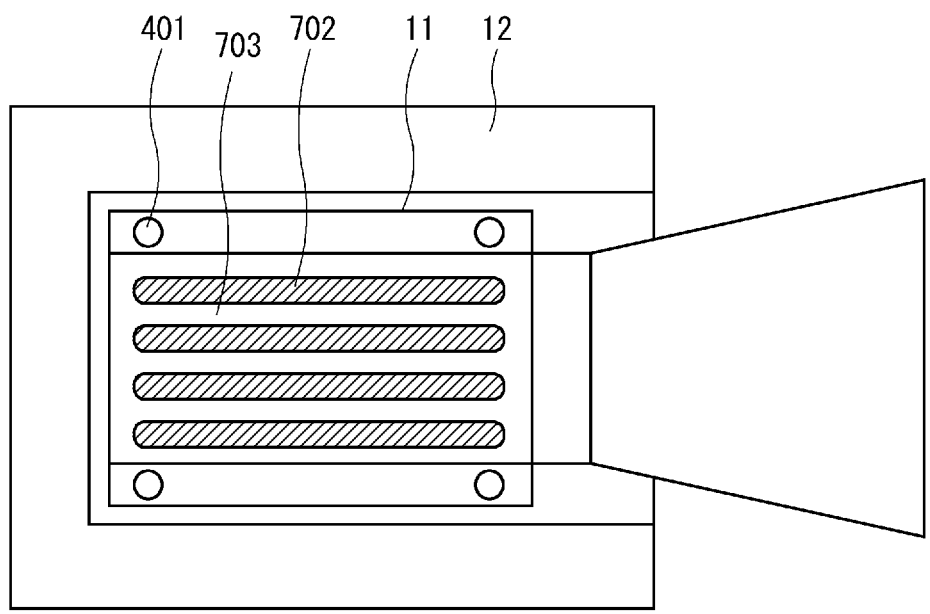
FIG. 11 is a schematic plan view showing a part of a modified example of the liquid crystal device shown in FIG. 10.

In this embodiment, an example case in which a plurality of circular heat-dissipating gels 602 are formed in a matrix pattern on the adhesive surface between the liquid crystal display element 11 and the heat sink 12 in a plan view has been described. However, the present disclosure is not limited to such an example. FIG. 11 is a schematic plan view showing a part of a liquid crystal device 2a, which is a modified example of the above-described liquid crystal device 2. As shown in FIG. 11, in a plan view, a plurality of heat-dissipating gels 602 may be arranged so that each of them extends in the y-axis direction and they are arranged with intervals therebetween in the x-axis direction.

Further, in this embodiment, an example case in which the liquid crystal display element 11 according to the first embodiment is mounted above the heat sink 12 has been described. However, the present disclosure is not limited to such an example. Even when an ordinary liquid crystal display element different from the liquid crystal display element 11 according to the first embodiment is mounted above the heat sink 12, a plurality of heat-dissipating gels 602 described in this embodiment can be applied.

According to this embodiment, it is possible to provide a liquid crystal device and a method for manufacturing a liquid crystal device capable of improving image quality.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

What is claimed is:

1. A liquid crystal device comprising:
   a plate;
   a plurality of heat-dissipating gels formed on the plate with intervals therebetween; and
   a liquid crystal display element disposed above the plate with the plurality of heat-dissipating gels interposed therebetween, the liquid crystal display element including a silicon substrate, a glass substrate, and a liquid crystal contained therebetween.

2. The liquid crystal device according to claim 1, wherein a space between the plurality of heat dissipating gels communicates with a space outside the plate and the liquid crystal display element.

3. A method for manufacturing a liquid crystal device, comprising:
   forming a plurality of heat-dissipating gels with intervals therebetween on a plate; and
   mounting, above the plate, a liquid crystal display element in such a manner that the plurality of heat-dissipating gels are interposed between the plate and the liquid crystal display element, the liquid crystal display element including a silicon substrate, a glass substrate, and a liquid crystal contained therebetween.

4. The method for manufacturing a liquid crystal device according to claim 3, wherein a space between the plurality of heat dissipating gels communicates with a space outside the plate and the liquid crystal display element.

5. The method for manufacturing the liquid crystal device according to claim 3, wherein
   the liquid crystal display element comprises:

the silicon substrate;
a spacer;
the glass substrate disposed to be opposed to the silicon substrate with the spacer interposed therebetween; and
the liquid crystal contained in a space between the glass substrate and the silicon substrate, and
the silicon substrate is formed so that, in a state before the liquid crystal display element is driven, its central part is curved so as to be brought closer to the glass substrate than its end part is.

* * * * *